United States Patent
Kim et al.

(10) Patent No.: US 10,150,913 B2
(45) Date of Patent: Dec. 11, 2018

(54) SCINTILLATOR, PREPARING METHOD THEREOF, AND APPLICATION THEREOF

(71) Applicant: Kyungpook National University Industry-Academic Cooperation Foundation, Daegu (KR)

(72) Inventors: Hong Joo Kim, Daegu (KR); Hwanbae Park, Daejeon (KR); Sunghwan Kim, Chungcheongbuk-do (KR); Gul Rooh, Daegu (KR)

(73) Assignee: KYUNGPOOK NATIONAL UNIVERSITY INDUSTRY-ACADEMIC CO, Daegu (KR)

( * ) Notice: Subject to any disclaimer, the term of this patent is extended or adjusted under 35 U.S.C. 154(b) by 118 days.

(21) Appl. No.: 15/310,959

(22) PCT Filed: Sep. 2, 2014

(86) PCT No.: PCT/KR2014/008207
§ 371 (c)(1),
(2) Date: Jan. 30, 2017

(87) PCT Pub. No.: WO2015/174584
PCT Pub. Date: Nov. 19, 2015

(65) Prior Publication Data
US 2018/0187076 A1    Jul. 5, 2018

(30) Foreign Application Priority Data
May 12, 2014  (KR) .................. 10-2014-0056409

(51) Int. Cl.
*C09K 11/77*  (2006.01)
*C09K 11/62*  (2006.01)
(Continued)

(52) U.S. Cl.
CPC .......... *C09K 11/7773* (2013.01); *C09K 11/62* (2013.01); *G01T 1/20* (2013.01);
(Continued)

(58) Field of Classification Search
CPC ..... C09K 11/7773; G01T 1/2023; G01T 7/00; G21K 4/00
(Continued)

(56) References Cited

U.S. PATENT DOCUMENTS 6,228,286 B1   5/2001   LeBlans et al.
7,368,719 B2   5/2008   Srivastava et al.
(Continued)

FOREIGN PATENT DOCUMENTS

EP          0685548 A1   12/1995
EP          1930395 A2    6/2008
KR   10-2008-0002650 A1   1/2008

OTHER PUBLICATIONS

International Search Report for International Application No. PCT/KR2014/008207 dated Jan. 27, 2015.
(Continued)

*Primary Examiner* — David Porta
*Assistant Examiner* — Gisselle Gutierrez
(74) *Attorney, Agent, or Firm* — Carter, Deluca, Farrell & Schmidt, LLP (57) ABSTRACT

The present disclosure relates to a scintillator, method for manufacturing the same and applications of scintillator. The scintillator has a chemical formula of $Tl_2ABC_6$:yCe, wherein A includes at least one alkali element; B includes at least one trivalent element; C includes at least one halogen element; and y is equal to or greater than 0 and equal to or smaller than 1.

12 Claims, 9 Drawing Sheets

(51) Int. Cl.
- *G01T 1/20* (2006.01)
- *G01T 7/00* (2006.01)
- *G21K 4/00* (2006.01)
- *G01T 1/202* (2006.01)

(52) U.S. Cl.
CPC ............ *G01T 1/2023* (2013.01); *G01T 7/00* (2013.01); *G21K 4/00* (2013.01)

(58) Field of Classification Search
USPC ..................................... 250/483.1
See application file for complete search history.

(56) References Cited

U.S. PATENT DOCUMENTS

| | | |
|---|---|---|
| 2008/0001086 A1 | 1/2008 | Srivastava et al. |
| 2013/0087712 A1 | 4/2013 | Szupryczynski et al. |
| 2013/0126741 A1* | 5/2013 | Srivastava ......... C09K 11/7773 250/362 |
| 2014/0008550 A1 | 1/2014 | Williams |
| 2016/0122641 A1* | 5/2016 | Carey ................ C09K 11/7783 428/691 |

OTHER PUBLICATIONS

J. Grannec et al., "NMR Study of Atomic Motions of Fluorine in the Elpasolite-Type Compounds Rb2KYF6, Rb2KInF6 and Tl2KInF6", Journal of Alloys and Compounds, vol. 238, May 1, 1996, pp. 49-53.

J. Arndt, "High Pressure Syntheses and Transformations of Hexagonal Elpasolitic Compounds A2IBIMIIIF6", Chemischer Informationsdienst, vol. 7, No. 7, Jan. 1, 1976, Abstract 10.

Extended European Search Report issued in corresponding Application No. EP 14891990.5 dated Feb. 6, 2018, 8 pages.

* cited by examiner

SCINTILLATOR, PREPARING METHOD THEREOF, AND APPLICATION THEREOF

CROSS-REFERENCE TO RELATED APPLICATIONS

The present application is a national phase application of International Patent Application No. PCT/KR2014/008207, filed on Sep. 2, 2014, which claims the benefit of and priority to Korean Patent Application No. 10-2014-0056409, filed on May 12, 2014, the entire contents of each of which are hereby incorporated by reference.

BACKGROUND OF THE INVENTION

The present invention disclosed herein relates to a scintillator, method for manufacturing the same and applications of scintillator.

Scintillator is a radiation sensor which converts x-ray and ionizing radiation such as gamma ray, electron beam, neutron beam to a light of visible ray wavelength region. It has been used in various areas such as medical imaging system, a radiation detector, and industrial radiation sensor. A radiation information may be obtained by measuring a light occurred by scintillation in accordance with a radiation exposure, using a suitable light receiving element such as photomultiplier tube or a photodiode. The radiation information may be used to obtain a radiation image through a series of processes.

Since NaI:Tl material was discovered in 1948 by Hofstadter, various types of scintillator has been developed to the present along the development of radio therapeutics, nuclear physics, and high-energy physics. Beginning with NaI:Tl, scintillators such as alkali halide scintillators like CsI, NaI, CsI:Tl, BGO($Bi_4Ge_3O_{12}$), $PbWO_4$, LSO($Lu_2SiO_5$: Ce) scintillators have been studied. However, a halide scintillator of CsI and NaI series has relatively low detection efficiency to the x-ray and gamma ray since atomic number of Cs, Na, I is low as 55, 11, 53, respectively.

BGO and $PbWO_4$ scintillators have relatively low light yield (8,200 ph/MeV, BGO)(200 ph/MeV, $PbWO_4$) than the light yield (65,000 ph/MeV, CsI:Tl)(38,000 ph/MeV, NaI:Tl) of halide series scintillator. Lu-based oxide scintillator is high cost material, has a higher melting temperature of 2,050° C., and has a crystal structure difficult to be grown in a single crystal. Also, it has a high background because of a total of 34 natural radioactive isotopes besides $^{176}$Lu (half-life: 3.78×$10^{10}$ year, the natural abundance: 2.59%) exists in Lu.

SUMMARY OF THE INVENTION

The present invention provides new material scintillators which has fast fluorescence decay time and high detection efficiency to a radiation, method for manufacturing the same and applications of scintillator.

Another problem to be solved by the present invention is to provide new material scintillators which have a single crystal structure and high detection efficiency especially to x-ray or gamma ray, method for manufacturing the same and applications of scintillator.

The problems to be solved by the present invention are not limited to the above mentioned descriptions. Other unmentioned objects thereof will be understandable by those skilled in the art from the following descriptions.

According to an aspect of the present invention, a scintillator comprises: a matrix material including thallium, at least one alkali element, at least one trivalent element, and at least one halogen element; and an activator doped in the matrix material.

In an embodiment of the present invention, the activator may comprise cerium.

According to another aspect of the present invention, a scintillator including thallium, at least one alkali element, at least one trivalent element, and at least one halogen element, as a matrix material, is provided.

In an embodiment of the present invention, the alkali element may be selected from Li and Na.

In an embodiment of the present invention, the trivalent element may be selected from Gd, La, Lu, Ce, Sc, and Y.

In an embodiment of the present invention, the halogen element may be selected from Cl, Br, and I.

According to another aspect of the present invention, a scintillator has a chemical formula of $Tl_2ABC_6$:yCe, wherein A includes at least one alkali element; B includes at least one trivalent element; C includes at least one halogen element; and y is equal to or greater than 0 and equal to or smaller than 1.

In an embodiment of the present invention, A may be selected from Li and Na.

In an embodiment of the present invention, B may be selected from Gd, La, Lu, and Ce.

In an embodiment of the present invention, B may be selected from Sc and Y.

In an embodiment of the present invention, C may be selected from Cl, Br, and I.

According to another aspect of the present invention, a scintillator comprises a matrix material and an activator, wherein the matrix material includes thallium halide, alkali halide, and trivalent element halide, and the activator is doped in the matrix material.

In an embodiment of the present invention, the activator may comprise cerium halide.

According to another aspect of the present invention, a radiographic image device comprising the scintillator is provided.

According to another aspect of the present invention, an intensifying screen comprising a film; and a scintillator coated in the film, wherein the scintillator comprises thallium, at least one alkali element, at least one trivalent element, at least one halogen element, and cerium is provided.

According to another aspect of the present invention, a method of manufacturing scintillator comprising: manufacturing a matrix material including thallium, at least one alkali element, at least one trivalent element, and at least one halogen element; and doping an activator to the matrix material is provided.

In an embodiment of the present invention, the manufacturing of the matrix material may comprise mixing thallium halide, alkali element halide, and trivalent element halide with mole fraction of 2:1:1.

In an embodiment of the present invention, the doping of the activator may comprise doping cerium halide to the matrix material.

In an embodiment of the present invention, the alkali element may be selected from Li and Na, the trivalent element may be selected from Gd, La, Lu, Ce, Sc, and Y, and the halogen element may be selected from Cl, Br, and I.

In an embodiment of the present invention, the method may further comprise growing a mixture of the matrix material and the activator into a single crystal, wherein a product of a descent speed of an ampoule including the mixture and a temperature gradient at crystal growth part may be in a range of 0.1~0.3° C./hr.

According to an embodiment of the present invention, new material scintillators which have a fast fluorescence decay time and a high detection efficiency to a radiation, method for manufacturing the same and applications of scintillator is provided.

Also, according to an embodiment of the present invention, new material scintillators which have a single crystal structure and has a high detection efficiency especially to x-ray or gamma ray, method for manufacturing the same and applications of scintillator is provided.

The problems to be solved by the present invention are not limited to the above mentioned effects. Other unmentioned objects thereof will be understandable by those skilled in the art from the following descriptions and drawings.

DETAILED DESCRIPTION

Various example embodiments will be described more fully hereinafter with reference to the accompanying drawings, in which some example embodiments are shown. Unless otherwise defined, all terms (including technical and scientific terms) used herein have the same meaning as generally understood by those skilled in the art. Moreover, detailed descriptions related to well-known functions or configurations will be ruled out in order not to unnecessarily obscure subject matters of the inventive concept. It is also noted that like reference numerals denote like elements in appreciating the drawings. Like reference numerals refer to like elements throughout this application.

According to an aspect of the present invention, a scintillator comprises: a matrix material including thallium, at least one alkali element, at least one trivalent element, and at least one halogen element; and an activator doped in the matrix material. The inventor has succeeded in developing the world's first thallium based elpasolite single crystal scintillator having great scintillation characteristics throughout long time studies and many experiments.

The elpasolite single crystal includes a trivalent cation, a monovalent cation, and a halide ion. Not all of combination of a trivalent cation, a monovalent cation, and a halide ion could be grown in a single crystal. It requires high technique to develop thallium-based elpasolite single crystal. The inventor was able to create new scintillator materials through investigating growing condition (melting temperature) and crystal growth condition (correlation between ampoule descent speed and temperature gradient of crystal growth part).

According to an aspect of the present invention, the scintillator has a chemical formula of $Tl_2ABC_6$:yCe. In an embodiment of the present invention, 'A' is at least one alkali element (for example, Na, Li), 'B' is at least one trivalent element (for example, Gd, La, Lu, Ce, Sc, Y), 'C' is at least one halogen element (for example, Cl, Br, I), and 'y' is mole fraction (concentration) of Ce ion that generates scintillation phenomenon doped as impurities and may have a value equal to or greater than 0 and equal to or smaller than 1 for appropriate scintillation amount.

According to an aspect of the present invention, the scintillator may be manufactured by mixing thallium halide, alkali element halide, and trivalent element halide with mole fraction of 2:1:1, respectively, doping an activator having cerium halide to the matrix material, and then growing to elpasolite single crystal. When growing a mixture of the matrix material and the activator into a single crystal, a descent speed of an ampoule including the mixture and a temperature gradient at crystal growth part significantly affect to a crystal growth. The inventor was able to figure out condition of a crystal growth. That is, a product of a descent speed of an ampoule and a temperature gradient at crystal growth part should be in a specific range, in order to grow the mixture of the thallium-based matrix material and the activator to the single crystal.

In an embodiment of the present invention, it is appropriate to limit the product of the descent speed of the ampoule and temperature gradient at crystal growth part in the range of 0.1~0.3° C./hr. When the product of the descent speed and temperature gradient is under 0.1° C./hr, a productivity goes bad, and when it goes over 0.3° C./hr, the crystal may be broken or crystallinity may decrease thereby features of scintillation amount and fluorescence decay time decrease. Also, it is appropriate to setting the melting temperature to 450~650° C. depending on trivalent element, alkali element, and halide element. Under these conditions, thallium-based single crystal elpasolite scintillate may be grown.

Because a photoelectric effect is proportional to $3^{rd}$ to $5^{th}$ power of atomic number of scintillator material, as the atomic number goes up, the detection efficiency to the gamma ray or x-ray increases. Therefore, the scintillator based on thallium which has a relatively high atomic number of 81 in accordance with an embodiment of the present invention is stably grown to the elpasolite single crystal under pre-determined growing condition, and has high detection efficiency to radiation, especially to x-ray or gamma ray and fast fluorescence decay time. As the scintillator in accordance with an embodiment of the present invention, has elpasolite single crystal structure, it has relatively high light yield, is easy to be grown than monoclinic or hexagonal crystal structure, and is not easily broken at particular crystal planes.

As the scintillator, in accordance with an embodiment of the present invention, has high effective atomic number (70), information related to radiation, such as x-ray, UV, alpha ray, beta ray, and neutrons may be detected efficiently as light of visible ray wavelength range, and exposure dose to human body may be reduced when used in medical imaging system. Also, since the scintillator has short fluorescence decay time, it may be used in an area such as PET requiring fast decay time.

Besides, it may be used in detecting not only x-ray, gamma ray, electron beam, proton beam, or other charged particle but also neutron beam, when it is grown using lithium or gadolinium having a large cross-section area to neutron reaction as a trivalent element. The scintillator, in accordance with an embodiment of the present invention, may be used as a new material scintillator for medical imaging system, such as CT, PET, SPECT, and gamma-ray camera, and also as radiation sensor in various industries.

Figure 1A:
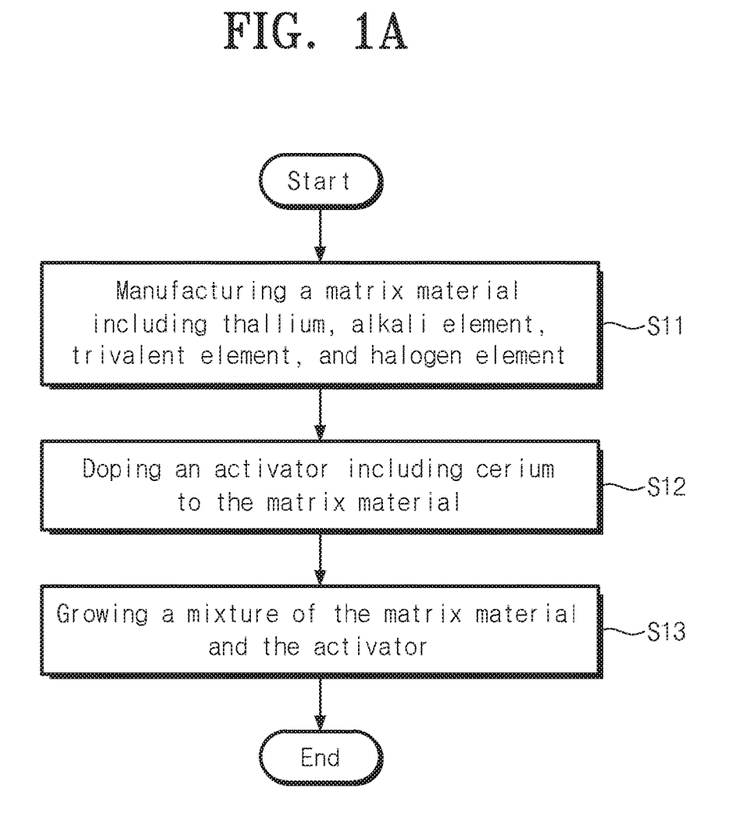
FIG. 1a shows a method for manufacturing a scintillator in accordance with an embodiment of the present invention.

FIG. 1a shows a method for manufacturing a scintillator in accordance with an embodiment of the present invention. Referring to FIG. 1a, a method of manufacturing scintillator comprises: a manufacturing step (S11) of manufacturing a matrix material including thallium, alkali element, trivalent element, and halogen element; a doping step (S12) of doping an activator to the matrix material; and a growing step (S13) of mixture of the matrix material and the activator into a single crystal.

An embodiment of the S11, the matrix material may be manufacture by mixing thallium halide, alkali element halide, and trivalent element halide with mole fraction of 2:1:1, respectively. For example, the thallium halide may be TlCl, TlBr, TlI or two or more mixtures thereof. When manufacturing the matrix material by mixing thallium halides different from each other, sum of the mole fraction of the mixed thallium halides may be double than alkali element halide (or trivalent element halide).

For example, alkali element halide may be LiCl, NaCl, LiBr, NaBr, LiI, NaI, or two or more mixtures thereof. When manufacturing the matrix material by mixing alkali element halides different from each other, sum of the mole fraction of mixed alkali element halides may be ½ of thallium halide (or trivalent element halide).

For example, trivalent element halide may be halide of trivalent element, such as Gd, La, Lu, Ce, Sc, Y, or may be mixture of trivalent element halides different from each other. When manufacturing the matrix material by mixing trivalent element halides different from each other, sum of the mole fraction of mixed different trivalent element halides may be ½ of thallium halide (or equivalent to alkali element halide).

An embodiment of the S12, the activator doped in the matrix material may comprise cerium halide. For example, the cerium halide may be $CeCl_3$, $CeBr_3$, $CeI_3$, or two or more mixtures thereof. In here, mole fraction of the cerium activator added to the matrix material may be over 0 and less than 1 with respect to a trivalent element or alkali element (mole fraction to thallium is over 0 and equal to or less than 0.5). Meanwhile, it is also possible to perform the steps S12 and S11 simultaneously.

An embodiment of the S13, a mixture of the matrix material and the activator is evacuated sealed in quartz ampoule and the sealed ampoule is grown into elpasolite scintillator single crystal in the Bridgman electric furnace. In order to easily manufacture seed crystal of single crystal, an end of the quartz ampoule having the sample may be sharpened. When growing single crystal by Bridgman method, a temperature of single crystal growth region, temperature gradient, and descent speed of the sample is very important, and the temperature of single crystal growth region has closely related with the melting temperature of the sample. In the Bridgman electric furnace, it has been found that setting the value of a descent speed of the ampoule and a temperature gradient of the crystal growth region to 0.1~0.3° C./hr is valid in growing thallium based elpasolite single crystal scintillator having excellent characteristics.

Figure 1B:
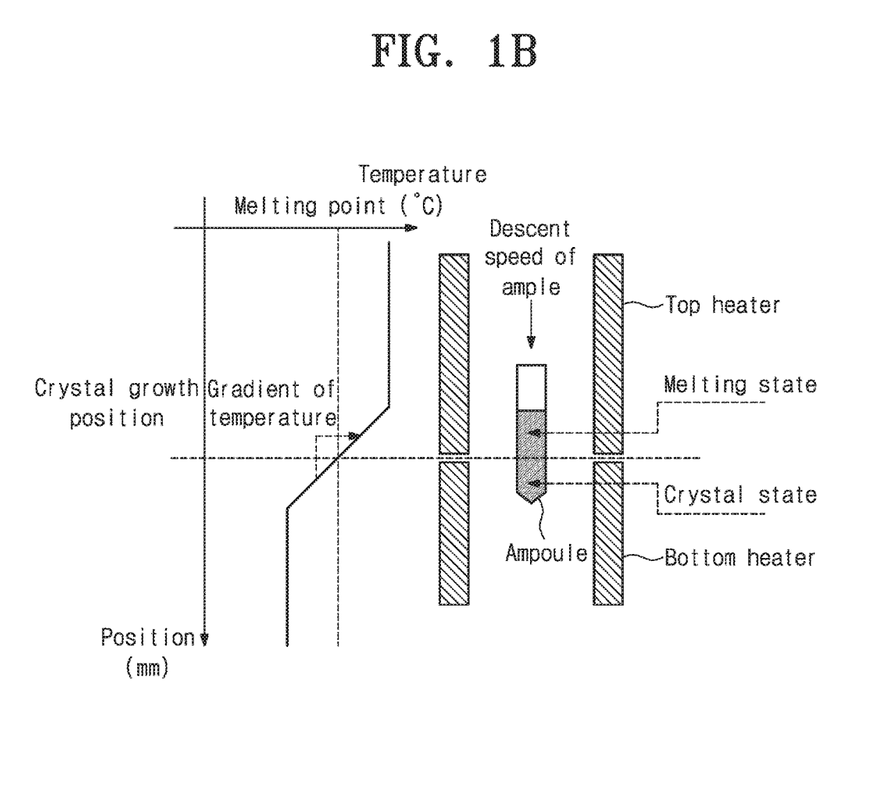
FIG. 1b is a schematic diagram of Bridgman electric furnace to explain requirement to have a single crystal of a scintillator in accordance with an embodiment of the present invention.

FIG. 1b is a schematic diagram of Bridgman electric furnace to explain requirement to have a fresh single crystal of a scintillator in accordance with an embodiment of the present invention. Referring to FIG. 1b, a top heater is arranged in upper side of a bottom heater and heats the ampoule to a temperature that is higher than a melting temperature (a melting point) determined depending on scintillator material. The bottom heater is arranged in bottom side of the top heater, and heats the ampoule with a second temperature that is lower than the melting temperature of the scintillator material.

Heating temperature of the top heater and the bottom heater may be set so that a temperature in the position of crystal growth may be the melting temperature of the scintillator material, and the value of a product of the descent speed of the ampoule and the temperature gradient of the crystal growth part to be 0.1~0.3° C./hr. In here, the position of crystal growth may be formed between the top and the bottom heaters. In an embodiment of the present invention, the temperature gradient of the crystal growth part may be measured value of a ratio of temperature change amount to the position change of the crystal growth position.

In an aspect of productivity, it is appropriate to set the ampoule descent speed more than 0.1 mm/hr. The temperature gradient of the crystal growth part may be set in accordance with the descent speed of the ampoule, preferably equal to or lower than 30° C./cm, so that the product of the descent speed of the ampoule and the temperature gradient of the crystal growth part be in the range of 0.1~0.3° C./hr.

In an embodiment of the present invention, the melting temperature may be 450~650° C. This is relatively low comparing to scintillators conventionally used. According to the embodiment of the present invention, as single crystal can be grown in the low temperature of 450~650° C., a growing cost may be decreased when manufacturing a scintillator.

<Embodiment 1>

TlCl, LiCl, GdCl$_3$ sample of the matrix material is mixed with mole fraction of 2:1:1, then CeCl$_3$ having a mole fraction of 0.1 (10%) is doped as the activator, and then sealed a mixture of the matrix material and the activator in the quartz ampoule approximately $10^{-5}$ torr of evacuated state. In order to easily generate seed crystal of single crystal, an end of the quartz ampoule having sample is sharpened. The sealed ampoule is grown as single crystal elpasolite scintillator in the Bridgman electric furnace to manufacture Tl$_2$LiGdCl$_6$:0.1Ce scintillator. In here, descent speed of ampoule is 0.2 mm/hr, temperature gradient of crystal growth is 10° C./cm, product of descent speed of ampoule and temperature gradient of crystal growth is 0.2° C./hr, and melting temperature of Tl$_2$LiGdCl$_6$:Ce is 540° C.

In order to investigate feature of scintillator of developed single crystal, the developed single crystal is cut with certain size and all faces are polished using Al$_2$O$_3$ (0.02 μm) powder on a polishing cloth (Buehler). A relative light yield and fluorescence decay time at room temperature is measured with pulse height analysis system using RbCs Electron tube Ltd. D726Uk. A signal from Electron tube Ltd. D726Uk is amplified using amplifier (×10, ×100), went through 400 MHz FADC (flash analog to digital converter), and then analyzed using ROOT program. Trigger used FPGA (field programmable gate array) chip. Emission spectrum of scintillator is measured in the range of 250~700 nm using spectrometer.

Figure 2:
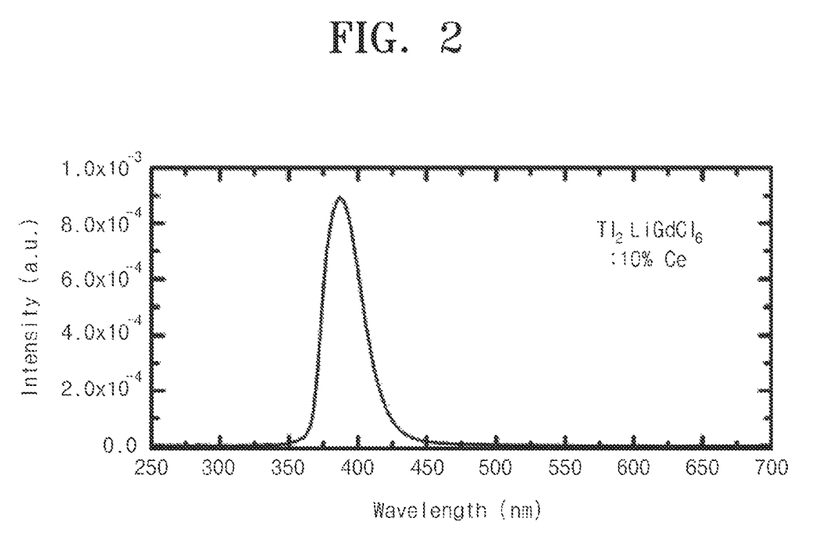
FIG. 2 is a graph showing emission spectrum of a scintillator ($Tl_2LiGdCl_6$:10% Ce) in accordance with an embodiment of the present invention.

FIG. 2 is a graph showing emission spectrum of a scintillator (Tl$_2$LiGdCl$_6$:10% Ce) in accordance with an embodiment of the present invention. Referring to FIG. 2, wavelength range of Tl$_2$LiGdCl$_6$:10% Ce scintillator under x-ray excitation is 350~450 nm, peak wavelength is 375 nm, and this match with the quantum efficiency of photo-multiplier tube.

Figure 3:
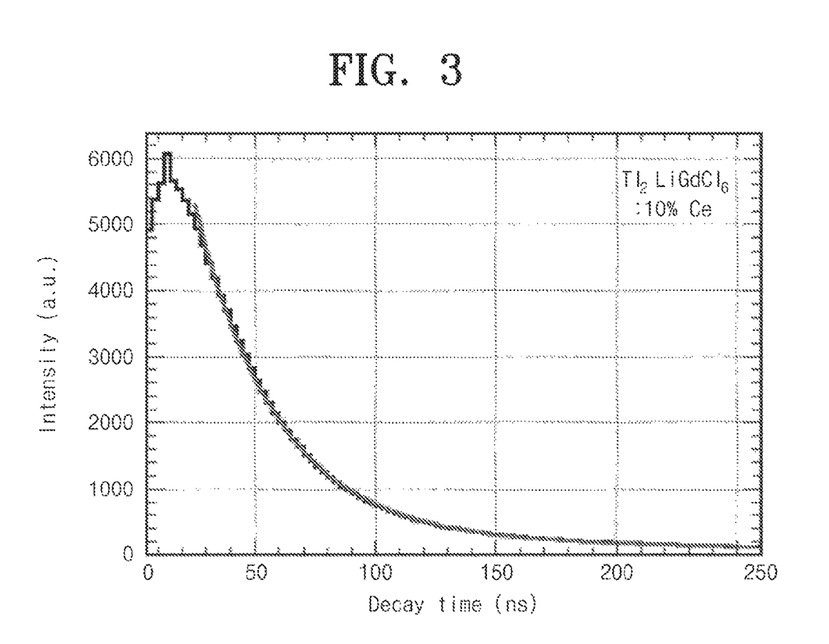
FIG. 3 is a graph showing fluorescence decay time of a scintillator ($Tl_2LiGdCl_6$:10% Ce) in accordance with an embodiment of the present invention.

FIG. 3 is a graph showing fluorescence decay time of a scintillator (Tl$_2$LiGdCl$_6$:10% Ce) in accordance with an embodiment of the present invention. Graph of FIG. 3 is an evaluation result about a feature of fluorescence decay time of Tl$_2$LiGdCl$_6$:10% Ce scintillator to 662 keV gamma ray of $^{137}$Cs standard gamma ray source. Fluorescence decay time is composed of three time components: fast time component of 34 ns taking most part (about 81%) of the entire fluorescence; intermediate time component of 191 ns taking about 10% of the entire fluorescence; and slow time component of 1.2 μs taking about 9% of the entire fluorescence.

The scintillator in accordance with an embodiment of the present invention has light yield of about 40,000 ph/MeV higher than the light yields of PbWO$_4$ scintillator (200 ph/MeV) and BGO(Bi$_{12}$GeO$_{20}$) scintillator (8,200 ph/MeV). And it has higher light yield than the light yields of halide scintillator (38,000 ph/MeV, NaI:Tl) and LSO (Lu$_2$SiO$_5$:Ce)(25,000 ph/MeV). Especially, a scintillation sensor for a positron emission tomography device needs to measure two gamma rays generated by pair annihilation at the same time and thereby requires fast fluorescence decay time. The scintillator in accordance with an embodiment of the present invention has fast fluorescence decay time, so it is appropriate to be applied to a positron emission tomography.

Figure 4:
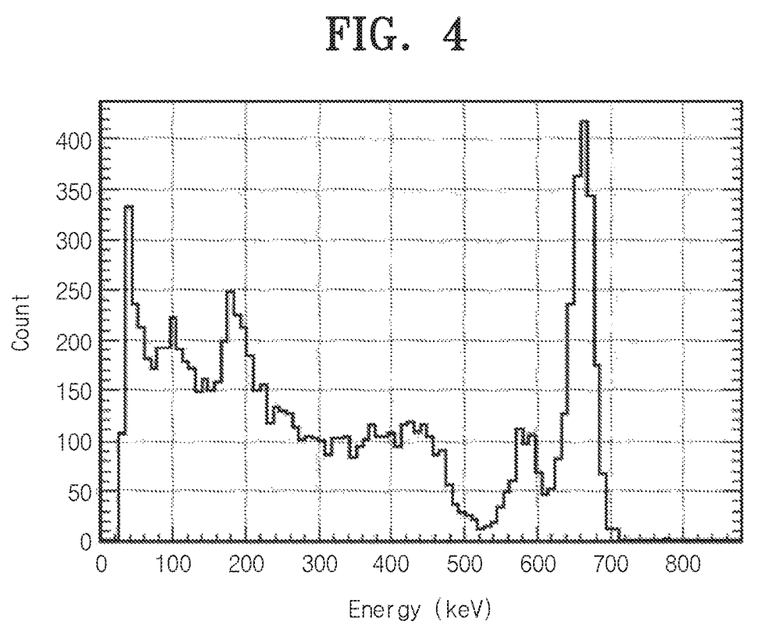
FIG. 4 is a graph showing pulse spectrum of a scintillator ($Tl_2LiGdCl_6$:10% Ce) to a $^{137}Cs$ gamma ray in accordance with an embodiment of the present invention.

FIG. 4 is a graph showing pulse height spectrum of a scintillator (Tl$_2$LiGdCl$_6$:10% Ce) of a $^{137}$Cs gamma ray in accordance with an embodiment of the present invention. FIG. 4 shows result of measuring pulse height spectrum of Tl$_2$LiGdCl$_6$:10% Ce scintillator of a $^{137}$Cs gamma ray at room temperature. A peak of pulse height spectrum of FIG. 4 is a photo peak of 662 keV gamma ray emitted from the $^{137}$Cs which is a standard gamma ray source, and a ratio of the full width at half maximum to a center value of this peak is defined as energy resolution. Referring to FIG. 4, the energy resolution of Tl$_2$LiGdCl$_6$:10% Ce scintillator in accordance with an embodiment of the present invention is measured as 4.6%. This is not only better than LSO (10% energy resolution, Lu$_2$SiO$_5$:Ce) and BGO(10.8% energy resolution, Bi$_{12}$GeO$_{20}$) but also better than the alkali halide scintillator (6.5% energy resolution, CsI:Tl)(6.6% energy resolution, NaI:Tl).

Figure 5:
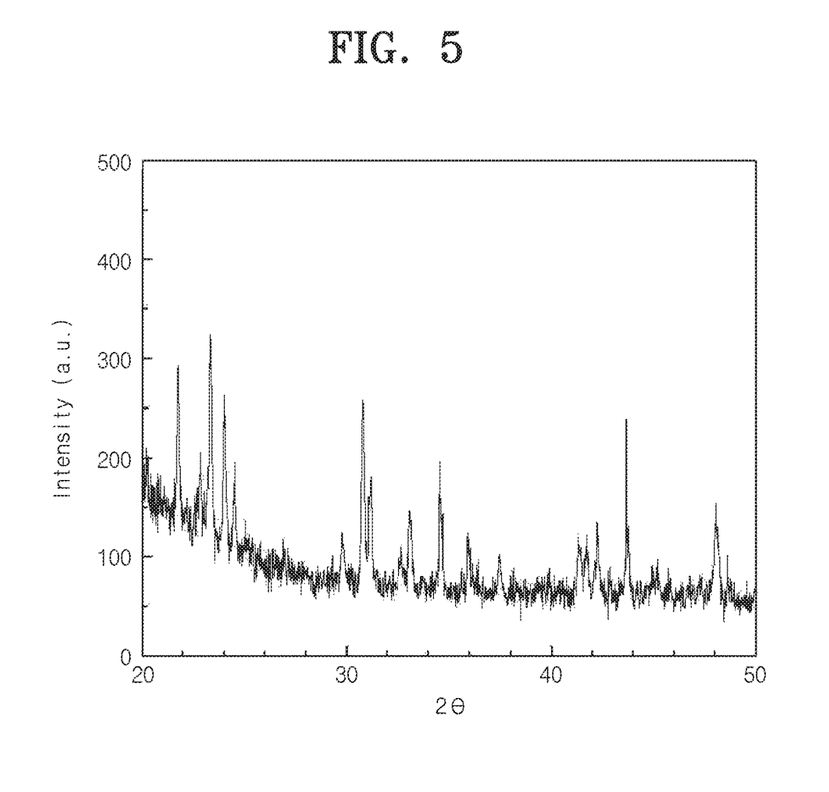
FIG. 5 is an X-Ray Diffraction (XRD) analysis result of a scintillator ($Tl_2LiGdCl_6$:10% Ce) in accordance with an embodiment of the present invention.

FIG. 5 is an X-Ray Diffraction (XRD) analysis result of a scintillator (Tl$_2$LiGdCl$_6$:10% Ce) in accordance with an embodiment of the present invention. XRD is analyzes diffracted x-ray information of material in crystal or powder form and able to understand components of material, crystal structure, and so on. The scintillator in accordance with an embodiment of the present invention was determined as a material with new crystal structure that has not existed in the prior crystal data base. Table 1 below compares Tl$_2$LiGdCl$_6$: 10% Ce (TLGC) in accordance with an embodiment of the present invention and major scintillators (comparison 1~4) used in present positron emission tomography device.

TABLE 1

| Feature of scintillator | TLGC(embodiment) | LSO(comparison 1) | LYSO(comparison 2) | GSO(comparison 3) | BGO(comparison 4) |
|---|---|---|---|---|---|
| Light yield (ph/MeV) | 40,000 | 25,000 | 24,000 | 8,000 | 8,200 |
| Energy resolution(for 662 keV gamma ray) | 4.6% | 10% | 9.3% | 9.2% | 10.8% |
| Effective atomic number | 70 | 66 | 66 | 59 | 74 |
| Density(g/cm$^3$) | 4.8 | 7.4 | 7.3 | 6.7 | 7.1 |
| Fluorescence decay time | 34 ns | 40 ns | 50 ns | 60 ns | 300 ns |
| Crystal growth temperature (° C.) | 540 ± 2.5 | 2,050 ± 2.5 | 2,047 ± 2.5 | 1,900 ± 2.5 | 1,050 ± 2.5 |
| Background radiation | no | yes | yes | no | no |
| Cost | low | high | high | medium | medium |

In table 1, chemical formulas of comparisons 1~4 are Lu$_2$SiO$_5$:Ce(LSO), Lu$_{2(1-x)}$Y$_{2x}$SiO$_5$:Ce(LYSO), Gd$_2$SiO$_5$:Ce(GSO), and Bi$_{12}$GeO$_{20}$ (BGO), respectively. BGO(comparison 4) has disadvantage of low light yield and long fluorescence decay time. Meanwhile, Lu based scintillators (comparisons 1,2) have advantage of having high density, high atomic number and fast fluorescence decay time. However, since they have high melting point, it is hard to develop single crystal and avoid background radiation by natural radioactive isotope. TLGC in accordance with an embodiment of the present invention has advantage of relatively high light yield compare to a scintillator used in positron emission tomography device, fast fluorescence decay time, and is able to make scintillator single crystal with low cost especially at low temperature.

<Embodiment 2>

$Tl_2LiGdCl_6$:0.01Ce scintillator is manufactured with the same condition with the embodiment 1 except doping $CeCl_3$ with mole fraction of 0.01 (1%) as an activator to a matrix material mixed with samples of TlCl, LiCl, $GdCl_3$.

Figure 6:
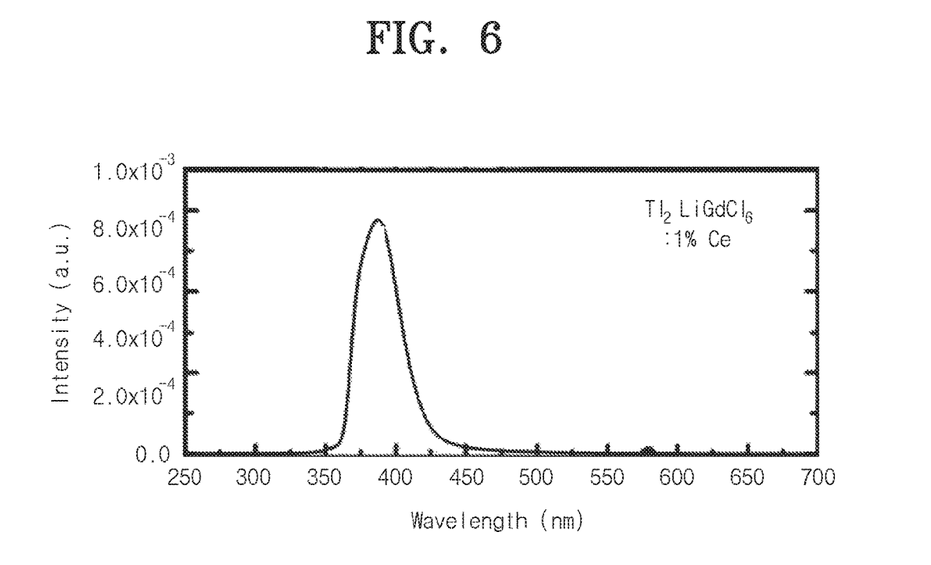
FIG. 6 is a graph showing emission spectrum of a scintillator ($Tl_2LiGdCl_6$:1% Ce) in accordance with an embodiment of the present invention.

FIG. 6 is a graph showing emission spectrum of a scintillator ($Tl_2LiGdCl_6$:1% Ce) in accordance with an embodiment of the present invention. Referring to FIG. 6, wavelength range of $Tl_2LiGdCl_6$:1% Ce scintillator under x-ray excitation is 350~450 nm, peak wavelength is 375 nm, and this match with the quantum efficiency of photo-multiplier tube.

<Embodiment 3>

TlCl, LiCl, $LuCl_3$ as sample of the matrix material is mixed as mole fraction 2:1:1, then $CeCl_3$ with mole fraction of 0.01 (1%) is doped as the activator, and then sealed a mixture of the matrix material and the activator in the quartz ampoule approximately $10^{-5}$ torr of evacuated state. In order to easily manufacture seed crystal of single crystal, an end of the quartz ampoule having sample is sharpened. The sealed ampoule is grown as single crystal elpasolite scintillator in the Bridgman electric furnace to manufacture $Tl_2LiLuCl_6$:1% Ce scintillator. In here, descent speed of ampoule is 0.2 mm/hr, temperature gradient of crystal growth is 10° C./cm, product of descent speed of ampoule and temperature gradient of crystal growth is 0.2° C./hr, and melting temperature of $Tl_2LiLuCl_6$:0.01Ce is 640° C.

Figure 7:
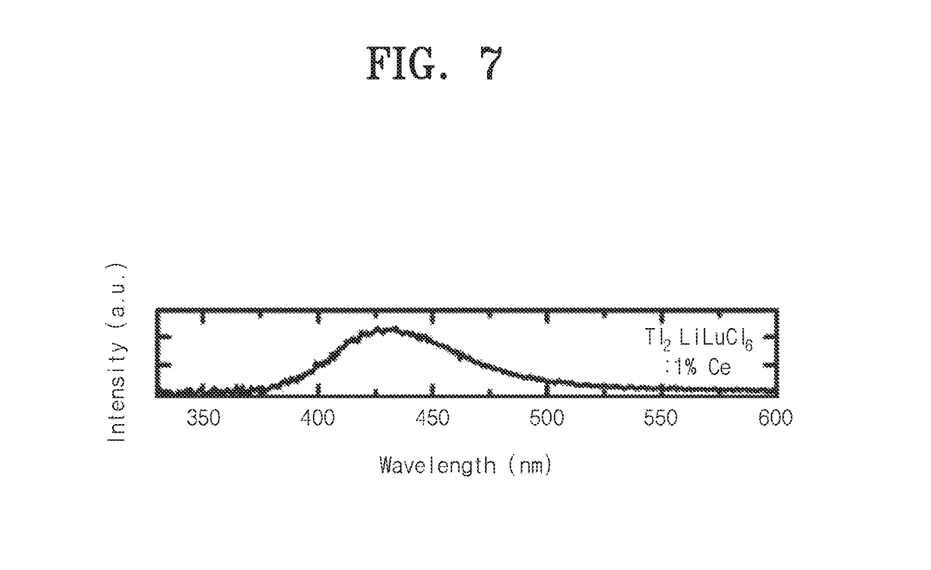
FIG. 7 is a graph showing emission spectrum of a scintillator ($Tl_2LiLuCl_6$:1% Ce) in accordance with an embodiment of the present invention.

FIG. 7 is a graph showing result of measuring emission spectrum of a scintillator ($Tl_2LiLuCl_6$:1% Ce) using spectrometer in accordance with an embodiment of the present invention. Referring to FIG. 7, wavelength range of $Tl_2LiLuCl_6$:1% Ce scintillator under x-ray excitation is 375~650 nm, peak wavelength is 428 nm, and this match with the quantum efficiency of photo-multiplier tube.

<Embodiment 4>

TlCl, LiCl, $YCl_3$ as sample of the matrix material is mixed as mole fraction 2:1:1, then $CeCl_3$ with mole fraction of 0.01 (1%) is doped as the activator, and then sealed a mixture of the matrix material and the activator in the quartz ampoule approximately $10^{-5}$ torr of evacuated state. In order to easily manufacture seed crystal of single crystal, an end of the quartz ampoule having sample is sharpened. The sealed ampoule is developed as single crystal elpasolite scintillator in the Bridgman electric furnace to manufacture $Tl_2LiYCl_6$:1% Ce scintillator. In here, descent speed of ampoule is 0.2 mm/hr, temperature gradient of crystal growth is 10° C./cm, product of descent speed of ampoule and temperature gradient of crystal growth is 0.2° C./hr, and melting temperature of $Tl_2LiYCl_6$:0.01Ce is 540° C.

Figure 8:
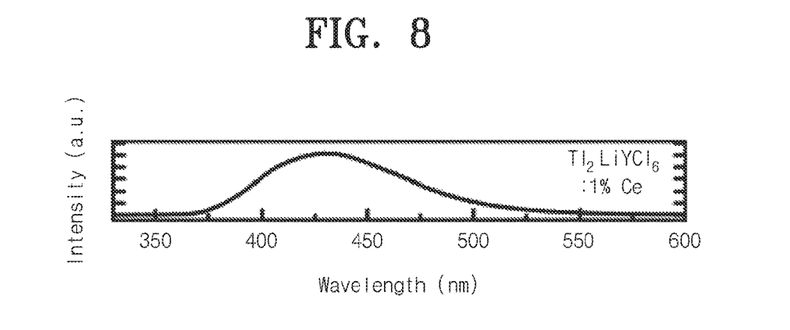
FIG. 8 is a graph showing emission spectrum of a scintillator ($Tl_2LiYCl_6$:1% Ce) in accordance with an embodiment of the present invention.

FIG. 8 is a graph showing result of emission spectrum of a scintillator ($Tl_2LiYCl_6$:1% Ce) using spectrometer in accordance with an embodiment of the present invention. Referring to FIG. 8, wavelength range of $Tl_2LiYCl_6$:1% Ce scintillator under x-ray excitation is 375~650 nm, peak wavelength is 430 nm, and this match with the quantum efficiency of photo-multiplier tube.

<Embodiment 5>

TlCl, LiCl, $LaCl_3$ as sample of the matrix material is mixed as mole fraction 2:1:1, then $CeCl_3$ with mole fraction of 0.05 (5%) is doped as the activator, and then sealed a mixture of the matrix material and the activator in the quartz ampoule approximately $10^{-5}$ torr of evacuated state. In order to easily manufacture seed crystal of single crystal, an end of the quartz ampoule having sample is sharpened. The sealed ampoule is developed as single crystal elpasolite scintillator in the Bridgman electric furnace to manufacture $Tl_2LiLaCl_6$:5% Ce scintillator. In here, descent speed of ampoule is 0.2 mm/hr, temperature gradient of crystal growth is 10° C./cm, product of descent speed of ampoule and temperature gradient of crystal growth is 0.2° C./hr, and melting temperature of $Tl_2LiLaCl_6$:0.05Ce is 610° C.

Figure 9:
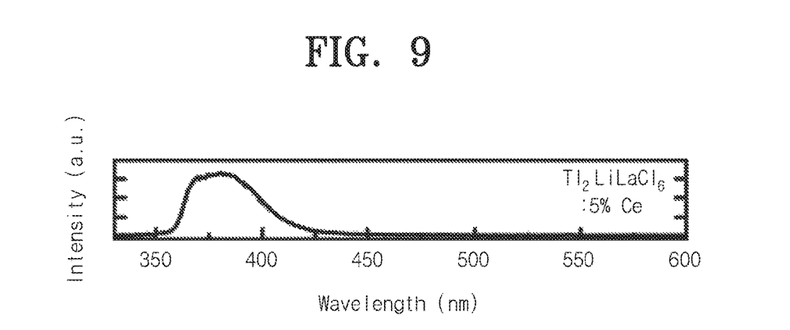
FIG. 9 is a graph showing emission spectrum of a scintillator ($Tl_2LiLaCl_6$:5% Ce) in accordance with an embodiment of the present invention.

FIG. 9 is a graph showing result of emission spectrum of a scintillator ($Tl_2LiLaCl_6$:5% Ce) using spectrometer in accordance with an embodiment of the present invention. Referring to FIG. 9, wavelength range of $Tl_2LiLaCl_6$:5% Ce scintillator under x-ray excitation is 330~450 nm, peak wavelength is 392 nm, and this match with the quantum efficiency of photo-multiplier tube.

<Embodiment 6>

TlCl, LiCl, $LaCl_3$ as sample of the matrix material is mixed as mole fraction 2:1:1, then $CeCl_3$ as the activator is doped as mole fraction of 0.01 (1%), and then sealed a mixture of the matrix material and the activator in the quartz ampoule approximately $10^{-5}$ torr of evacuated state. In order to easily manufacture seed crystal of single crystal that will be developed, an end of the quartz ampoule having sample is sharpened. The sealed ampoule is developed as elpasolite scintillator single crystal in the Bridgman electric furnace to manufacture $Tl_2LiLaCl_6$:1% Ce scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2LiLaCl_6$:0.01Ce is 610° C.

Figure 10:
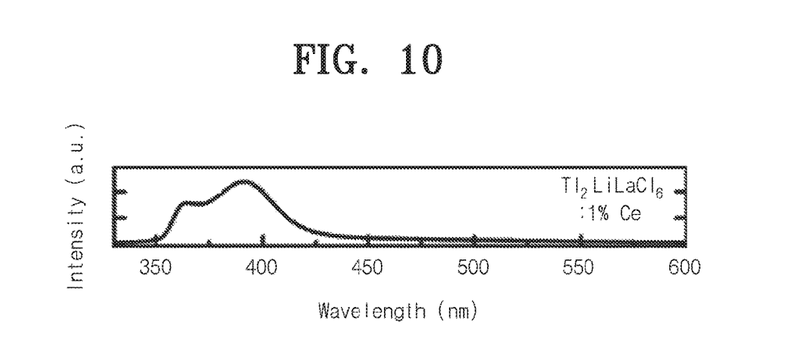
FIG. 10 is a graph showing emission spectrum of a scintillator ($Tl_2LiLaCl_6$:1% Ce) in accordance with an embodiment of the present invention.

FIG. 10 is a graph showing result of emission spectrum of a scintillator ($Tl_2LiLaCl_6$:1% Ce) using spectroscopy in accordance with an embodiment of the present invention. Referring to FIG. 10, wavelength range of $Tl_2LiLaCl_6$:1% Ce scintillator under x-ray excitation is 330~450 nm, peak wavelength is 392 nm, and this match with the quantum efficiency of photo-multiplier tube.

<Embodiment 7>

TlCl, LiCl, $ScCl_3$ as sample of the matrix material is mixed as mole fraction 2:1:1, then $CeCl_3$ as the activator is doped as mole fraction of 0.01 (1%), and then sealed a mixture of the matrix material and the activator in the quartz ampoule approximately $10^{-5}$ torr of evacuated state. In order to easily manufacture seed crystal of single crystal that will be developed, an end of the quartz ampoule having sample is sharpened. The sealed ampoule is developed as elpasolite scintillator single crystal in the Bridgman electric furnace to manufacture $Tl_2LiScCl_6$:1% Ce scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2LiScCl_6$:0.01Ce is 650° C.

Figure 11:
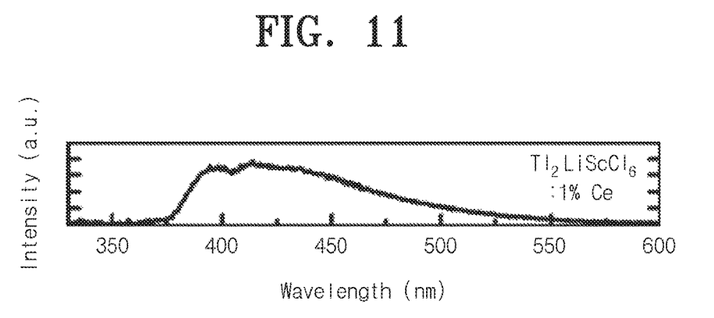
FIG. 11 is a graph showing emission spectrum of a scintillator ($Tl_2LiScCl_6$:1% Ce) in accordance with an embodiment of the present invention.

FIG. 11 is a graph showing result of emission spectrum of a scintillator ($Tl_2LiScCl_6$:1% Ce) using spectrometer in accordance with an embodiment of the present invention. Referring to FIG. 11, wavelength range of $Tl_2LiScCl_6$:1% Ce scintillator under x-ray excitation is 350~600 nm, peak wavelength is 410 nm, and this match with the quantum efficiency of photo-multiplier tube.

<Embodiment 8>

TlCl, LiCl, $ScCl_3$ as sample of the matrix material is mixed as mole fraction 2:1:1 then sealed in the quartz ampoule approximately $10^{-5}$ torr of evacuated state. In order to easily manufacture seed crystal of single crystal, an end of the quartz ampoule having sample is sharpened. The sealed ampoule is developed as elpasolite scintillator single crystal in the Bridgman electric furnace to manufacture $Tl_2LiScCl_6$ scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2LiScCl_6$ is 650° C.

Figure 12:
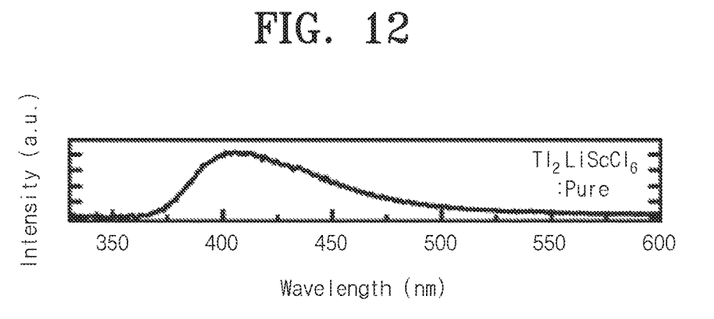
FIG. 12 is a graph showing emission spectrum of a scintillator ($Tl_2LiScCl_6$) in accordance with an embodiment of the present invention.

FIG. 12 is a graph showing result of emission spectrum of a scintillator ($Tl_2LiScCl_6$) using spectrometer in accordance with an embodiment of the present invention. Referring to FIG. 12, wavelength range of $Tl_2LiScCl_6$ scintillator under x-ray excitation is 350~600 nm, peak wavelength is 410 nm, and this match with the quantum efficiency of photo-multiplier tube.

<Embodiment 9>

TlCl, LiCl, $GdBr_3$ as sample of the matrix material is mixed as mole fraction 2:1:1 then $CeBr_3$ as the activator is doped as mole fraction of 0.1 (10%), and then sealed in the quartz ampoule approximately $10^{-5}$ torr of evacuated state. In order to easily manufacture seed crystal of single crystal, an end of the quartz ampoule having sample is sharpened. The sealed ampoule is developed as elpasolite scintillator single crystal in the Bridgman electric furnace to manufacture $Tl_2LiGdBr_6$:10% Ce scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2LiGdBr_6$:10% Ce is 450° C.

Figure 13:
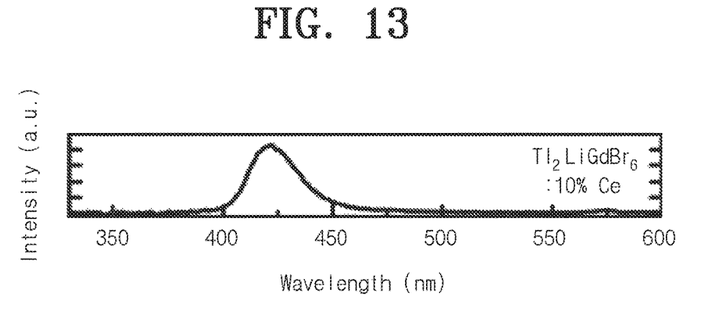
FIG. 13 is a graph showing emission spectrum of a scintillator ($Tl_2LiGdBr_6$:10% Ce) in accordance with an embodiment of the present invention.

FIG. 13 is a graph showing result of emission spectrum of a scintillator ($Tl_2LiGdBr_6$:10% Ce) using spectrometer in accordance with an embodiment of the present invention. Referring to FIG. 13, wavelength range of $Tl_2LiGdBr_6$:10% Ce scintillator under x-ray excitation is 380~500 nm, peak wavelength is 424 nm, and this match with the quantum efficiency of photo-multiplier tube.

<Embodiment 10>

TlCl, LiCl, $CeCl_3$ as sample of the matrix material is mixed as mole fraction 2:1:1 then sealed in the quartz ampoule approximately $10^{-5}$ torr of evacuated state. In order to easily manufacture seed crystal of single crystal, an end of the quartz ampoule having sample is sharpened. The sealed ampoule is developed as elpasolite scintillator single crystal in the Bridgman electric furnace to manufacture $Tl_2LiCeCl_6$ scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2LiCeCl_6$ is 490° C.

Figure 14:
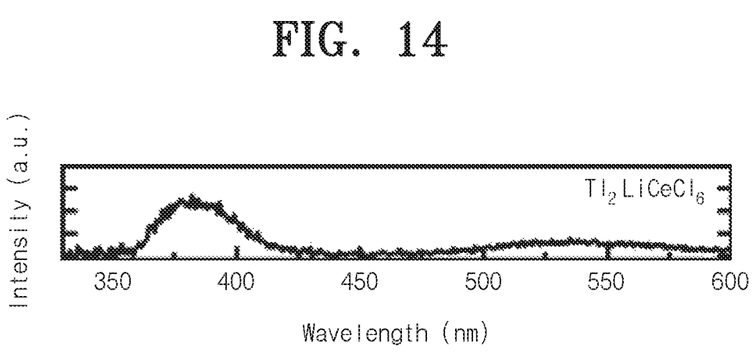
FIG. 14 is a graph showing emission spectrum of a scintillator ($Tl_2LiCeCl_6$) in accordance with an embodiment of the present invention.

FIG. 14 is a graph showing result of emission spectrum of a scintillator ($Tl_2LiCeCl_6$) using spectrometer in accordance with an embodiment of the present invention. Referring to FIG. 14, wavelength range of $Tl_2LiCeCl_6$ scintillator under x-ray excitation is 360~440 nm, peak wavelength is 383 nm, and this match with the quantum efficiency of photo-multiplier tube.

<Embodiment 11>

TlCl, NaCl, $CeCl_3$ as sample of the matrix material is mixed as mole fraction 2:1:1 then sealed in the quartz ampoule approximately $10^{-5}$ torr of evacuated state. In order to easily manufacture seed crystal of single crystal, an end of the quartz ampoule having sample is sharpened. The sealed ampoule is developed as elpasolite scintillator single crystal in the Bridgman electric furnace to manufacture $Tl_2NaCeCl_6$ scintillator. In here, descent speed of ampoule is 0.2 mm/hr, temperature gradient of crystal growth is 10° C./cm, descent speed of ampoule times temperature gradient of crystal growth is 0.2° C./hr, and melting temperature of $Tl_2NaCeCl_6$ is 500° C.

Figure 15:
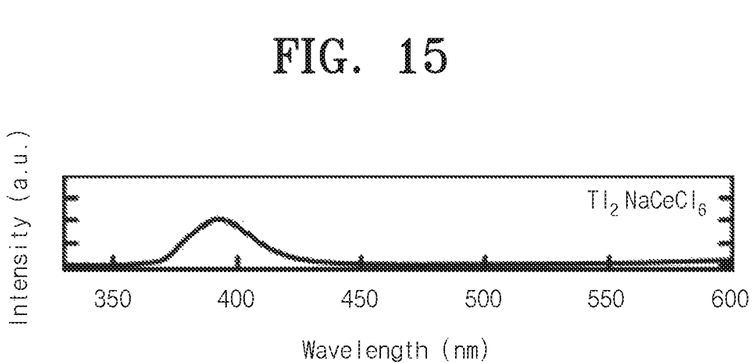
FIG. 15 is a graph showing emission spectrum of a scintillator ($Tl_2NaCeCl_6$) in accordance with an embodiment of the present invention.

FIG. 15 is a graph showing result of emission spectrum of a scintillator ($Tl_2NaCeCl_6$) using spectrometer in accordance with an embodiment of the present invention. Referring to FIG. 15, wavelength range of $Tl_2NaCeCl_6$ scintillator under x-ray excitation is 350~450 nm, peak wavelength is 392 nm, and this match with the quantum efficiency of photo-multiplier tube.

The thallium based elpasolite scintillator single crystal in accordance with an embodiment of the present invention has high atomic number of thallium (Z=81), high detection characteristic to x-ray and gamma ray and also has crystal structure (elpasolite crystal structure) which is easy to grow into a single crystal by Czochralski or Bridgman method. Also, its wavelength range matches well with the quantum efficiency of photo-multiplier tube and has fast fluorescence decay time and thereby can be used in radiation imaging system such as CT (Computed Tomography) obtaining radiation image, PET (Positron Emission Tomography), gamma-ray camera, SPECT (Single Photon Emission Computed Tomography), or Anger camera.

Also, it may be applied in neutron detection by manufacturing a scintillator including Gd and Li ions with large neutron absorption cross section in a matrix material, and may be used as radiation sensor for measuring various radiation such as UV light, electron, alpha and beta particles. The scintillator in accordance with an embodiment of the present invention may be used in manufacturing intensifying screen such as for radiation imaging device or radiation sensor. For example, intensifying screen may be manufactured by combining glue and the scintillator in accordance with an embodiment of the present invention.

Foregoing embodiments are examples of the present invention. Furthermore, the above contents merely illustrate and describe preferred embodiments and embodiments may include various combinations, changes, and environments. That is, it will be appreciated by those skilled in the art that substitutions, modifications and changes may be made in these embodiments without departing from the principles and spirit, the scope of which is defined in the appended claims and their equivalents. Furthermore, it is not intended that the scope of this application be limited to these specific embodiments or to their specific features or benefits. Rather, it is intended that the scope of this application be limited solely to the claims which now follow and to their equivalents.

What is claimed is:

1. A scintillator comprising:
   a matrix material including thallium, at least one alkali clement, at least one trivalent element, and at least one halogen element, the matrix material having a chemical formula of $Tl_2LiBC_6$, wherein B includes at least one element selected from Gd, La, Lu, Ce, Sc and Y, and C includes one element selected from Cl and Br.

2. The scintillator of claim 1, further comprising:
   an activator doped in the matrix material.

3. The scintillator of claim 2, wherein the activator comprises cerium.

4. The scintillator of claim 1, wherein the scintillator comprises a chemical formula of $Tl_2LiBC_6$:yCe, wherein y is equal to or greater than 0 and equal to or smaller than 1.

5. The scintillator of claim 1, wherein the, matrix material includes thallium halide, alkali halide, and trivalent element halide.

6. The scintillator of claim 5, further comprising:
   an activator doped in the matrix material, the activator comprising cerium halide.

7. A radiographic image device comprising the scintillator of claim 1.

8. An intensifying screen comprising:
a film; and
a scintillator coated in the film,
wherein the scintillator comprises thallium, at least one alkali element, at least one trivalent element, at least one halogen element, and cerium, the matrix material having a chemical formula of $Tl_2LiBC_6$:yCe, wherein B includes at least one element selected from Gd, La, Lu, Ce, Sc and Y, C includes one element selected from Cl and Br and y is equal to or greater than 0 and equal to or smaller than 1.

9. A method of manufacturing a scintillator comprising:
manufacturing a matrix material including thallium, at least one alkali element, at least one trivalent element, and at least one halogen element; and
doping an activator to the matrix material,
wherein the matrix material has a chemical formula of $Tl_2LiBC_6$, wherein B includes at least one element selected from Gd, La, Lu, Ce, Sc and Y, and C includes one element selected from Cl and Br.

10. The method of claim 8, wherein the manufacturing of the matrix material comprises:
mixing thallium halide, alkali element halide, and trivalent element halide with mole fraction of 2:1:1.

11. The method of claim 8, wherein the doping of the activator comprises:
doping cerium halide to the matrix material.

12. The method of claim 8, further comprising:
growing a mixture of the matrix material and the activator into a single crystal, and
wherein a product of a descent speed of an ampoule including the mixture and a temperature gradient at crystal growth part is in a range of 0.1 ~0.3 ° C/hr.

* * * * *